United States Patent Office 2,794,929
Patented June 4, 1957

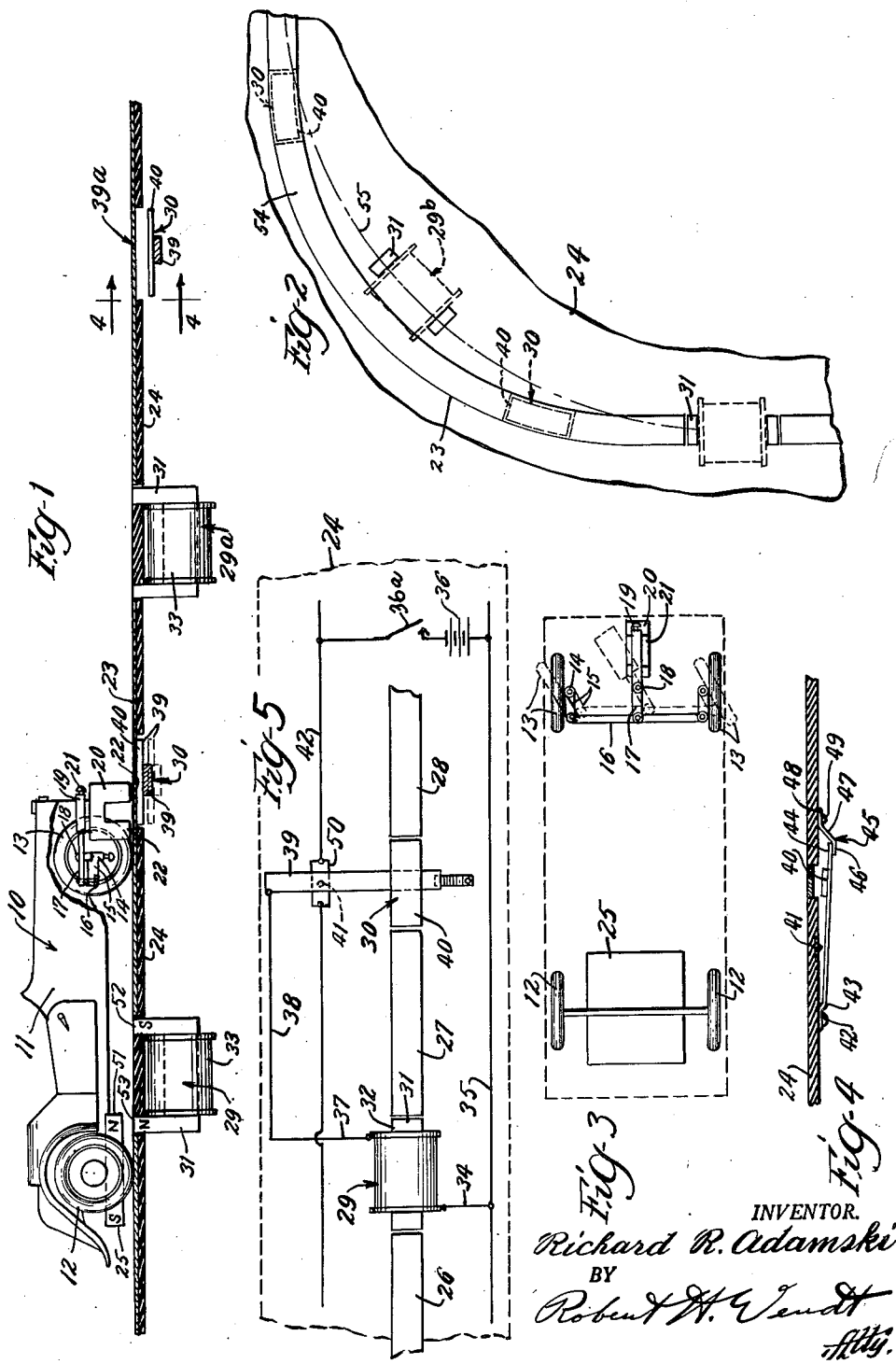

2,794,929
TOY MAGNET PROPELLED AND DIRECTED VEHICLES

Richard R. Adamski, Chicago, Ill., assignor of one-fourth to William Adamski, Elmwood Park, Ill.

Application August 22, 1955, Serial No. 529,780

2 Claims. (Cl. 310—12)

The present invention relates to toy magnet propelled and directed vehicles, and is particularly concerned with the provision of various types of toy vehicles, such as automobiles, but may also be embodied in any type of toy vehicle.

One of the objects of the invention is the provision of an improved auto vehicle propelling and directing mechanism which is simple in construction, dependable in its operation, capable of economical manufacture, and adapted to be used for a long period of time without necessity for repair or replacement of its parts.

Another object of the invention is the provision of an improved toy vehicle which is propelled by magnetic forces in which the weight of the vehicle may be reduced to a minimum and in which the vehicle may be dirigible and adapted to be caused to follow a track having any desired pattern.

Another object of the invention is the provision of an improved electrically driven automotive toy having a central control for controlling the movements of the vehicle by remote control, to permit the operator to stop and start vehicles at a distance at will.

Another object of the invention is the provision of improved track units to be used with a magnet propelled vehicle in which the track units supply the energy for propelling the vehicle, by receiving such energy from an electric battery or other direct current power pack electrically connected to energize certain magnets only when the vehicle is in a predetermined position adjacent the magnets.

Another object of the invention is the provision of an improved vehicle and track assembly in which the vehicle is steered and driven by means of magnetic force which is capable of economical operation by means of dry batteries, and in which the drain on the battery is reduced to a minimum.

Other objects and advantages of the invention will be apparent from the following description and the accompanying drawings, in which similar characters of reference indicate similar parts throughout the several views.

Referring to the single sheet of drawings,

Fig. 1 is a side elevational view of a fragment of a toy vehicle assembly embodying the invention;

Fig. 2 is a fragmentary view showing a curve in the track, in plan;

Fig. 3 is a top plan view of the vehicle showing its driving and steering mechanism;

Fig. 4 is a sectional view taken on the plane of the line 4—4 of Fig. 5, looking in the direction of the arrows;

Fig. 5 is a top plan view of a section of the track, including one driving magnet and one of the switches which control its energization.

Referring to Fig. 1, 10 indicates a vehicle embodying the invention in the form of a small automobile having its chassis 11 provided with two rear wheels 12 and with two front dirigible wheels 13. The two front wheels are pivotally mounted for steering at 14 and have the wheel hubs connected to steering arms 15, which are joined by a connecting rod 16 for directing both wheels at the same time.

The connecting rod 16 is connected to a pivotal lever 17 pivoted at 18 on the chassis and having a forwardly extending tongue end 19. A U-shaped permanent magnet 20 is provided with a pair of U-shaped stirrups 21 arranged about the tongue 19 so that the magnet hangs down with its pole faces 22 in proximity to the track.

The magnet 20 is adapted to move laterally, pivoting on the pivot carried by the chassis at 18, and causing the wheels to move with it.

The track assembly 23 may be mounted upon strips of insulating fiber 24 in the form of sections, each section including one electromagnet and one or more switches, further to be described. The curved sections of track may also be provided; and the sections of track may include track crossings at right angles or of X-form or sufficient curved track to make a figure 8, a circle or any desired curve.

The vehicle 10 has a strip of paramagnetic material or preferably a relatively long permanent magnet 25 carried below the center of the central plane of the vehicle 10 at the back wheels; and the location of this magnet has a special relation to the track, as will be further described.

All of the magnets, permanent or otherwise, utilize magnetic metal of high coercive force. The track 24 includes a multiplicity of strips of magnetic metal 26, 27, 28, extending longitudinally of the track and mounted in alignment on the insulating fiber strips 24.

These metal strips are of paramagnetic material, such as iron or steel; dirigible magnet 20 hangs with its pole face 22 as close to the strips 26—28 as possible without coming into contact.

The strips 26—28 are preferably narrow like the magnet 20, and thus act as keepers for the magnet 20, which tends to polarize adjacent sections of the strips 26—28 so that magnet 20 is attracted to these strips of the stock. Thus, when the track curves, the magnet 20 follows it; and the vehicle 10 can be made to follow a desired path.

Strips 26—28 of paramagnetic material are interrupted to provide space for the magnet 29 and for one or more electric switch units 30 in each section of track.

The electromagnet 29 may consist of a U-shaped core 31 of soft iron or other paramagnetic metal having the rectangular ends 32 of the pole pieces secured in complementary holes in the fiber strips 24.

Each core 31 has a suitable coil 33 of insulated wire; and each coil has one terminal 34 connected to a common conductor 35 leading to the battery 36. Each coil has its other terminal 37 connected by conductor 38 to a resilient switch arm 39, which carries a paramagnetic keeper 40 in alignment with the track 26, 27, 28. The battery circuit includes a control switch 36a for controlling the starting and stopping of the vehicle.

The switch unit 30 includes a fixed contact 41 which is connected to a common conductor 42 leading to the other terminal of battery 36.

Fig. 5 is merely exemplary of one section of the track; and the devices and circuits employed and all of the other track sections have their circuits in parallel with the first-mentioned section.

Referring to Fig. 4, this shows a section of the track in which the insulating strip of fiber 24 has the resilient arm 25 riveted to it at 42 and provided with an offset at 43 so that the body of the resilient arm 39 is spaced from the fixed contact 41.

Resilient arm 39 extends transversely of the track and is provided with the keeper 40 for the permanent magnet 20. The end 44 of arm 39 rests on a stop 45, comprising a sheet metal member having a parallel flange 46 and the offset 47 and an attaching flange 48.

The attaching flange 48 is riveted to the fiber strip 24 at 49. The resilient switch arm 39 is provided with initial tension, urging it against the stop 45; but when the permanent magnet 20 arrives above the keeper 40 on the switch arm 39, the keeper is drawn up until it engages the fixed contact 41.

The fixed contact 41 is carried by a metal strip 50 connected to conductor 42. The distance between the permanent magnet 20 and the bar magnet 25 is such that when the permanent magnet 20 is arriving over the keeper 40, the permanent magnet 25 has its north pole above the north pole of electromagnet 29. There is an attraction between the north pole 51 of magnet 25 and the south pole 52 of the electromagnet 29; and there is a repulsion acting between the north pole 51 of magnet 25 and the north pole 53 of the electromagnet.

The result is that the permanent magnet 25 is drawn forward quickly. By the time the permanent magnet 25 arrives in registry with the electromagnet 29, the permanent magnet 20 has passed the switch 39 with its keeper 40.

Thus the switch is opened at contact 41 and arm 39 even before the permanent magnet 25 reaches the point of greatest attraction toward the electromagnet poles 52 and 53. The momentum of the vehicle 10 carries it forward until its magnet 20 reaches the second switch unit 39a; and the magnet 25 is ready to be acted on by the second electromagnet 29a.

Since the steering magnet 20 is attached to the front wheels, it will follow a curved track, such as that indicated at 54; but the rear wheels will follow a line such as that indicated at 55 inside the curve.

Thus the electromagnets, such as 29b for curves, may be located inside the curve to come into alignment with the permanent magnet 25 on the rear wheels as they are making a short cut along the line 55 on curves. On straight line sections of track the electromagnets 29 may all be in alignment.

By making the keeper or the permanent magnet 25 wide, as shown in Fig. 3, it will be in position to register with the poles of the electromagnets, although they are relatively narrow; and thus it may not be necessary to offset the electromagnets 29b at the curves.

In some embodiments of the invention the member 25 may merely be a plate of paramagnetic material, such as soft iron.

It will thus be observed that I have invented an improved system for toy vehicles by means of which the wheels are steered or directed magnetically and driven magnetically. The heavy electromagnets are carried by the fixed track; and the weight of the vehicle is reduced to a minimum, including a pair of permanent magnets, which, however, are desirable to give the vehicle sufficient momentum.

The present auto may be manufactured at a very low cost and is adaptable to follow all kinds of patterns of tracks. The drain on the batteries is reduced to a minimum; and the vehicle may be propelled at a high speed along the track, from which it will not deviate because it is directed by the permanent magnet, following the track.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A toy vehicle assembly comprising a thin fiber board supporting panel and a strip of paramagnetic material carried by the lower side of said panel and concealed thereby, said strip having straight portions and curved portions defining a predetermined path invisible from the top of the panel, said panel having a plurality of depending electromagnets carried thereby, each electromagnet having windings and having a U-shaped core with pole faces arranged substantially in the plane of said panel, the said magnets being spaced from each other along said path, and each electromagnet having a corresponding electric switch near said path, in advance of its electromagnet, each said switch having a resiliently mounted arm biased away from the panel to engage a fixed stop and movable toward the panel to engage a fixed contact, and each arm having a paramagnetic keeper arranged between ends of said strip portions, which are interrupted for each switch, and a vehicle having rear wheels rotatably mounted, and said vehicle also supporting a permanent bar magnet at its rear end with poles arranged in the order of the electromagnet poles along the path, said vehicle having front dirigible wheels provided with a directing tongue supporting a depending permanent magnet, located to attract the keeper of the adjacent switch arm to close the corresponding fixed contact which is connected to the permanent magnet windings then in advance of the bar magnet carried by the rear of the vehicle and to a source of energizing E. M. F., the bar magnet then being rearwardly of the electromagnet adjacent thereto, and being attracted forwardly, propelling the vehicle which, in moving forward, moves the directing permanent magnet out of range of the switch keeper to open the switch and deenergize the electromagnet as the vehicle moves forward and is carried by momentum into the field of the next electromagnet and adjacent the next keeper on the next switch arm, the directing magnet then following said strip to direct the vehicle and keep it on the path to the next switch and next electromagnet.

2. A toy vehicle assembly comprising a thin fiber board supporting panel and a strip of paramagnetic material carried by the lower side of said panel and concealed thereby, said strip having straight portions and curved portions defining a predetermined path invisible from the top of the panel, said panel having a plurality of depending electromagnets carried thereby, each electromagnet having windings and having a U-shaped core with pole faces arranged substantially in the plane of said panel, the said magnets being spaced from each other along said path, and each electromagnet having a corresponding electric switch near said path, in advance of its electromagnet, each said switch having a resiliently mounted arm biased away from the panel to engage a fixed stop and movable toward the panel to engage a fixed contact, and each arm having a paramagnetic keeper arranged between ends of said strip portions, which are interrupted for each switch, and a vehicle having rear wheels rotatably mounted, and said vehicle also supporting a permanent bar magnet at its rear end with poles arranged in the order of the electromagnet poles along the path, said vehicle having front dirigible wheels provided with a directing tongue supporting a depending permanent magnet, located to attract the keeper of the adjacent switch arm to close the corresponding fixed contact which is connected to the permanent magnet windings then in advance of the bar magnet carried by the rear of the vehicle and to a source of energizing E. M. F., the bar magnet then being rearwardly of the electromagnet adjacent thereto, and being attracted forwardly, propelling the vehicle which, in moving forward, moves the directing permanent magnet out of range of the switch keeper to open the switch and deenergize the electromagnet as the vehicle moves forward and is carried by momentum into the field of the next electromagnet and adjacent the next keeper on the next switch arm, the directing magnet then following said strip to direct the vehicle and keep it on the path to the next switch and next electromagnet, and a remote control switch for energizing or de-energizing the circuit, which includes the electromagnets on the panel, causing the vehicle to move at will over the top of the panel without any visible propelling means or motor on the vehicle.

References Cited in the file of this patent

UNITED STATES PATENTS

| | | |
|---|---|---|
| 514,718 | Leffler | Feb. 13, 1894 |
| 561,898 | Leffler | June 9, 1896 |
| 564,262 | Stern | July 21, 1896 |
| 776,826 | Caldwell | Dec. 6, 1904 |
| 2,609,413 | Nemeth | Sept. 2, 1952 |
| 2,638,347 | Maggi | May 12, 1953 |
| 2,691,946 | Marmo | Oct. 19, 1954 |